US012676417B2

(12) United States Patent
Kwon

(10) Patent No.: US 12,676,417 B2
(45) Date of Patent: Jul. 7, 2026

(54) MONOPOLE ANTENNA

(71) Applicants: Hyundai Motor Company, Seoul (KR); Kia Corporation, Seoul (KR)

(72) Inventor: Oh Yun Kwon, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 87 days.

(21) Appl. No.: 18/946,573

(22) Filed: Nov. 13, 2024

(65) Prior Publication Data

US 2025/0192440 A1 Jun. 12, 2025

(30) Foreign Application Priority Data

Dec. 8, 2023 (KR) ........................ 10-2023-0177336

(51) Int. Cl.
*H01Q 9/30* (2006.01)
*H01Q 1/42* (2006.01)

(52) U.S. Cl.
CPC ................. *H01Q 9/30* (2013.01); *H01Q 1/42* (2013.01)

(58) Field of Classification Search
CPC .......... H01Q 9/30; H01Q 1/42; H01Q 1/3275; H01Q 1/50; H01Q 1/12; H01Q 9/40; H01Q 1/32; H01Q 1/48; H01Q 9/34; H01Q 5/40; H01Q 5/357; H01Q 5/321; H01Q 5/307; H01Q 11/08; H01Q 1/362; H01F 7/0242; H01P 11/001; B60R 11/0205
See application file for complete search history.

(56) References Cited

U.S. PATENT DOCUMENTS

| | | | | |
|---|---|---|---|---|
| 6,509,878 | B1 * | 1/2003 | Tornatta, Jr. | H01Q 1/3275 343/715 |
| 2007/0035467 | A1 * | 2/2007 | Chen | H01Q 9/34 343/702 |
| 2015/0214607 | A1 * | 7/2015 | Lee | H01Q 1/3275 29/600 |

* cited by examiner

*Primary Examiner* — Renan Luque
(74) *Attorney, Agent, or Firm* — MORGAN, LEWIS & BOCKIUS LLP

(57) ABSTRACT

A monopole antenna includes an antenna portion including a monopole structure disposed perpendicular to a ground surface; a signal feeding portion configured to provide a signal to be fed to the antenna portion; a signal transmission portion disposed parallel to the ground surface and connected to the antenna portion and the signal feeding portion to transmit the signal to the antenna portion; and a base disposed between the ground surface and the signal transmission portion to support the signal transmission portion, wherein the antenna portion includes a shape in which a plurality of cylinders with different radii are connected.

18 Claims, 7 Drawing Sheets

MONOPOLE ANTENNA

CROSS-REFERENCE TO RELATED APPLICATION

The present application claims priority to Korean Patent Application No. 10-2023-0177336, filed on Dec. 8, 2023, the entire contents of which is incorporated herein for all purposes by this reference.

BACKGROUND OF THE PRESENT DISCLOSURE

Field of the Present Disclosure

The present disclosure relates to a monopole antenna.

Description of Related Art

The content described in the present section simply provides background information for the present disclosure and does not form related art.

As a wireless communication technology develops, various types of wireless communication antennae are being mounted on a vehicle to provide various types of wireless communication services to occupants in the vehicle. Most of antennae for various In-Vehicle Infotainment (IVI) services such as AM/FM radio, DMB/DAB, SXM, GNSS, and CCS/eCall are built into a roof antenna of the vehicle. In general, a roof antenna has a large number of antennae built into a shark fin-shaped cover and is mounted on the rear side of a roof of a vehicle. Because a roof panel of the vehicle is made of metal and has a large area, the antennae built into the shark fin-shaped cover are based on a monopole antenna.

In a vehicle development stage, an antenna gain for each frequency is measured in an actual vehicle chamber in a non-reflective environment to verify antenna performance. In the instant case, performance suitability of an antenna that is a measurement target is determined with an ideal monopole antenna as a reference. The ideal monopole antenna has a wavelength of ¼ of an operating frequency, is disposed perpendicular above a ground surface, and a signal transmission part and/or a signal feeding part are disposed parallel to the ground surface. Furthermore, a structure that may have an influence on a field distribution, such as a conductor and a dielectric, should not be present around a radiator.

Thus, an ideal monopole antenna structure for a determination of performance suitability in an antenna development stage is necessary.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a monopole antenna including: an antenna portion including a monopole structure disposed perpendicular to a ground surface; a signal feeding portion configured to provide a signal to be fed to the antenna portion; a signal transmission portion disposed parallel to the ground surface and connected to the antenna portion and the signal feeding portion to transmit the signal to the antenna portion; and a base disposed between the ground surface and the signal transmission portion to support the signal transmission portion, wherein the antenna portion includes a shape in which a plurality of cylinders with different radii are connected.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
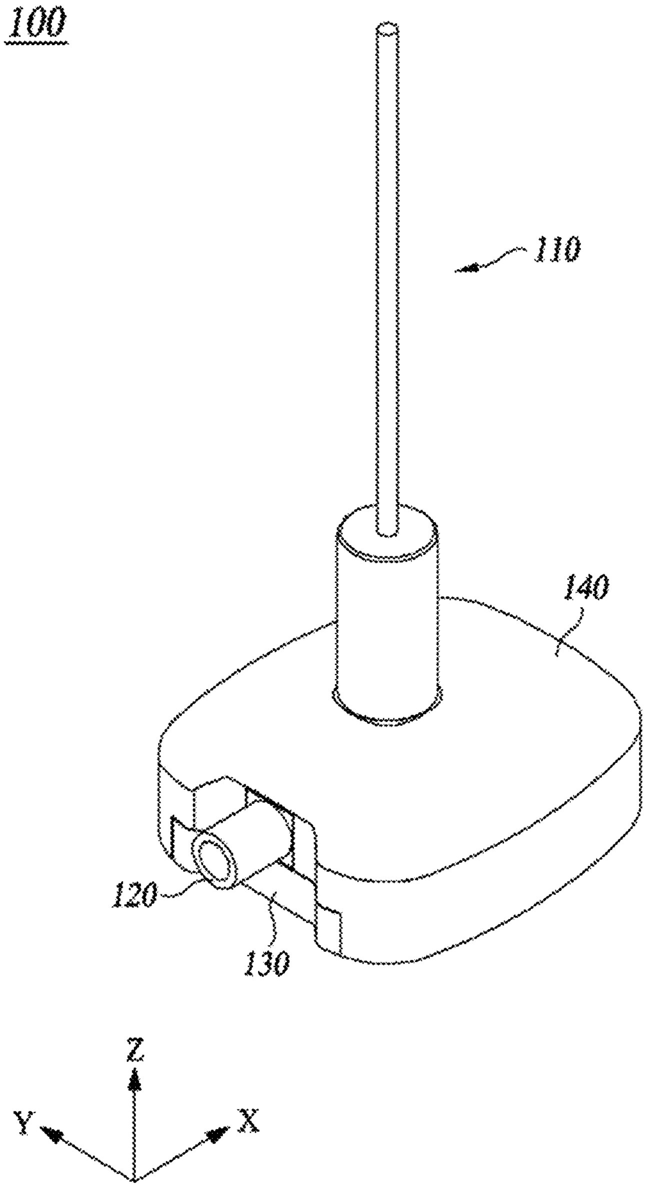
FIG. 1 is a perspective view of a monopole antenna according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A monopole antenna according to an exemplary embodiment can provide an ideal monopole antenna structure for a determination of performance suitability in an antenna development stage.

A monopole antenna according to an exemplary embodiment can provide a stable structure through a shape in which cylinders with different radii are connected, and can expand a bandwidth of the antenna.

A monopole antenna according to an exemplary embodiment can efficiently transmit signals by implementing a signal transmission portion as a printed circuit board (PCB) type with a transmission line formed therein.

The problems to be solved as an exemplary embodiment of the present disclosure are not limited to the problems mentioned above, and other problems not mentioned will be clearly understood by those skilled in the art from the description below.

Hereinafter, some exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a portion 'includes' or 'comprises' a component, the portion is meant to further include other components, not to exclude thereof unless stated to the contrary. The terms such as 'unit', 'module', and the like refer to one or more units for processing at least one function or operation, which may be implemented by hardware, software, or a combination thereof.

FIG. 1 is a perspective view of a monopole antenna according to an exemplary embodiment of the present disclosure.

Figure 2:
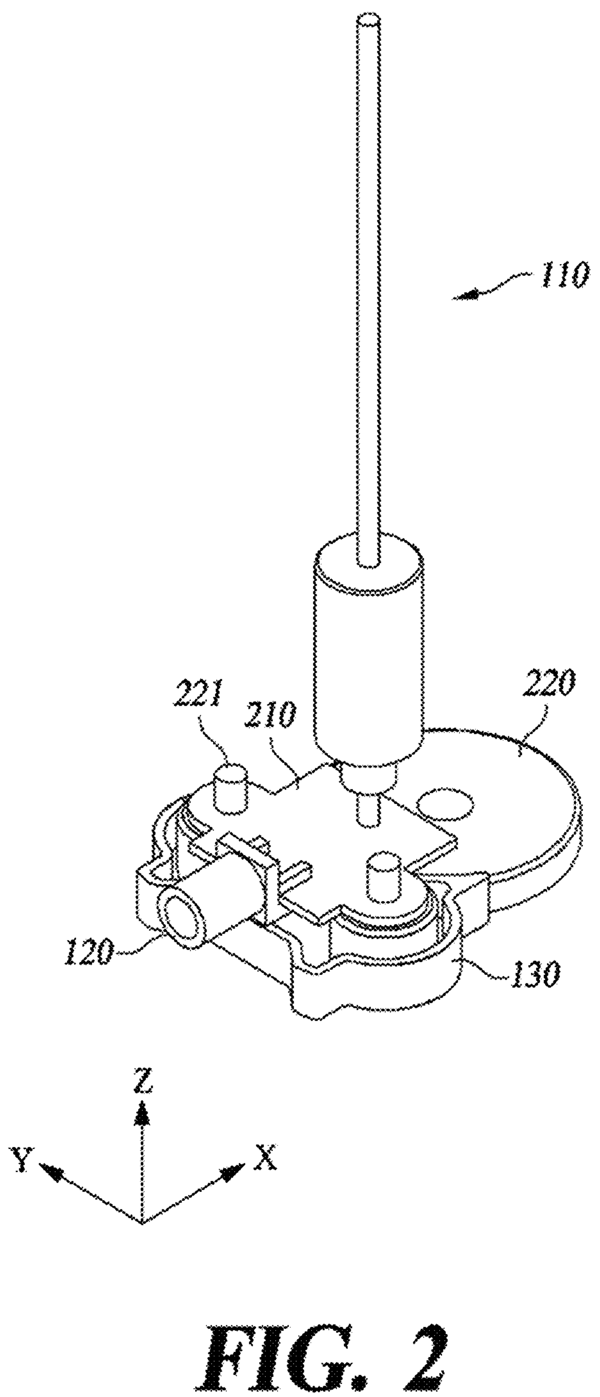
FIG. 2 is a perspective view of the monopole antenna excluding a cover according to an exemplary embodiment of the present disclosure, and is a view exemplarily illustrating an internal structure.

FIG. 2 is a perspective view of the monopole antenna excluding a cover according to an exemplary embodiment of the present disclosure, and is a view exemplarily illustrating an internal structure.

Figure 3:
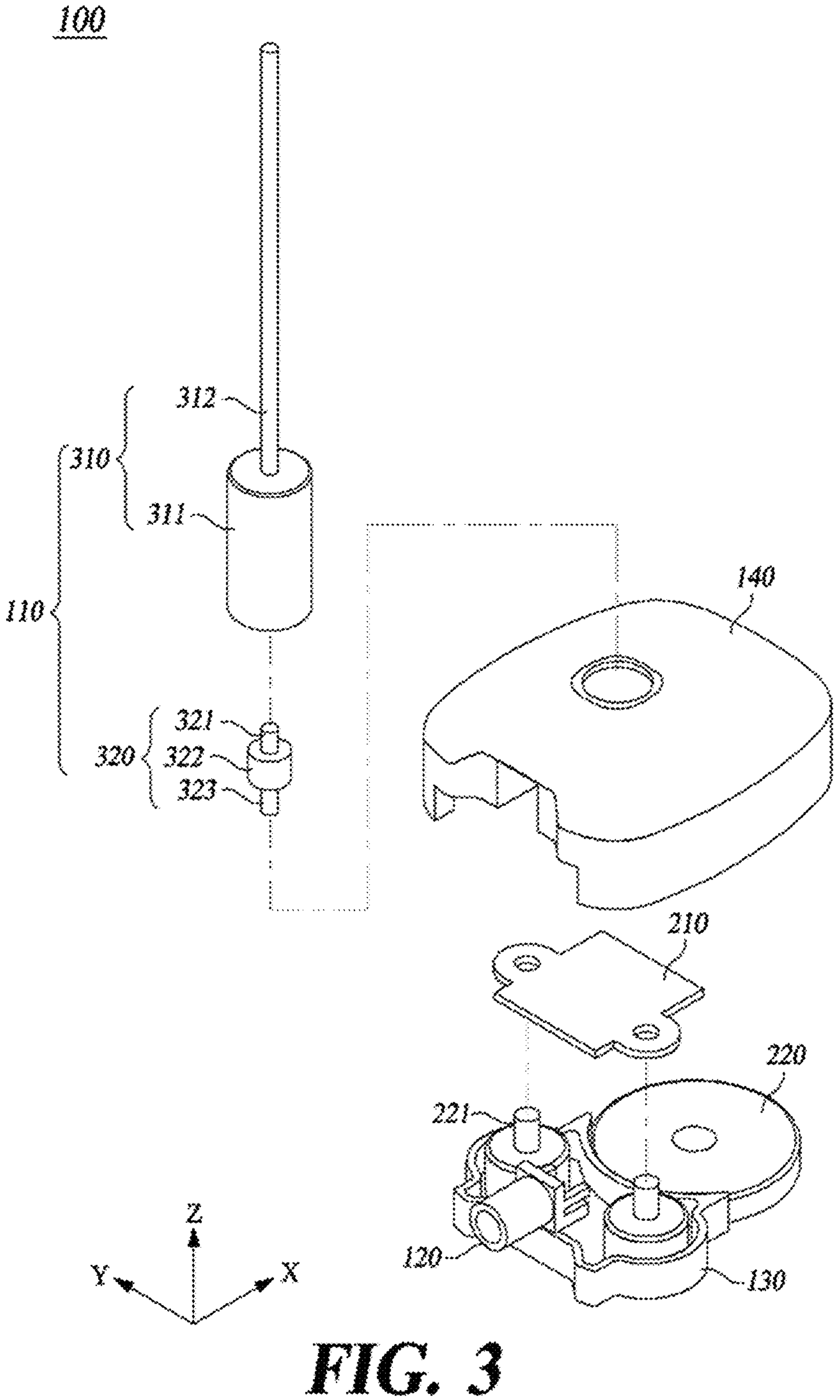
FIG. 3 is an exploded perspective view of the monopole antenna according to the exemplary embodiment of the present disclosure.

FIG. 3 is an exploded perspective view of the monopole antenna according to the exemplary embodiment of the present disclosure.

Figure 4:
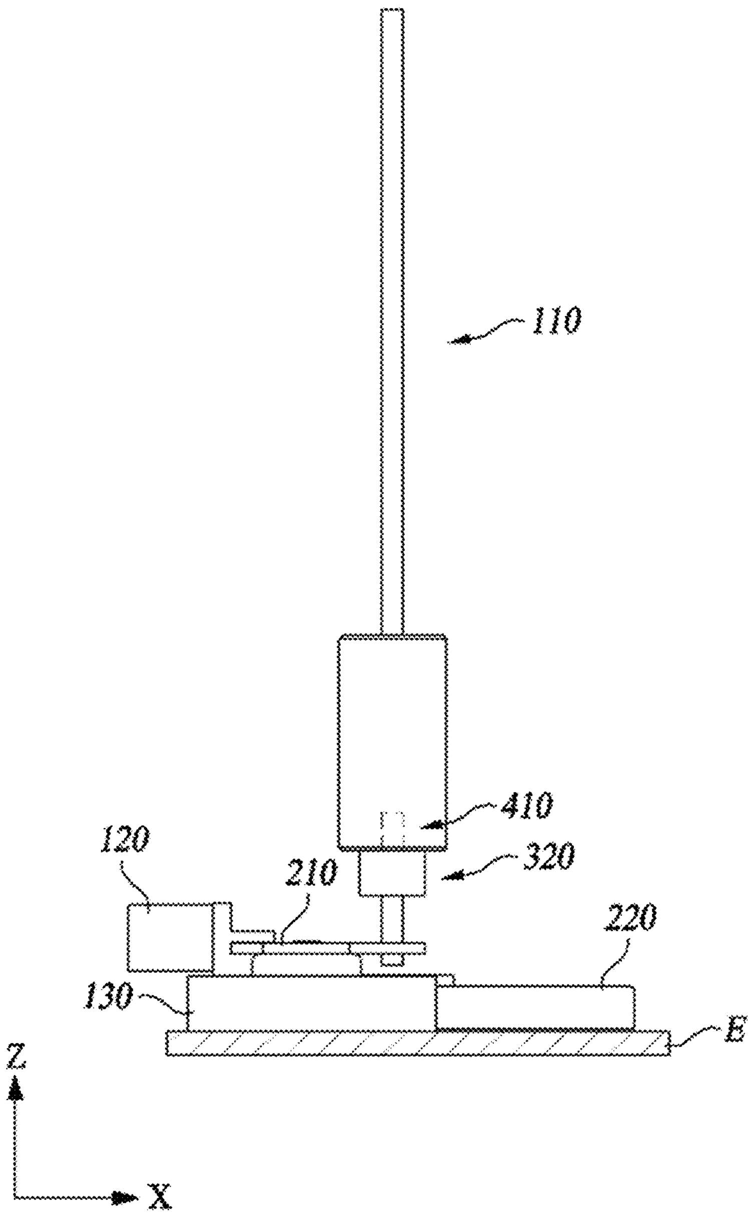
FIG. 4 is a side view of the monopole antenna according to an exemplary embodiment of the present disclosure, and is a view exemplarily illustrating an internal structure.

FIG. 4 is a side view of the monopole antenna according to an exemplary embodiment of the present disclosure, and is a view exemplarily illustrating an internal structure.

Figure 5:
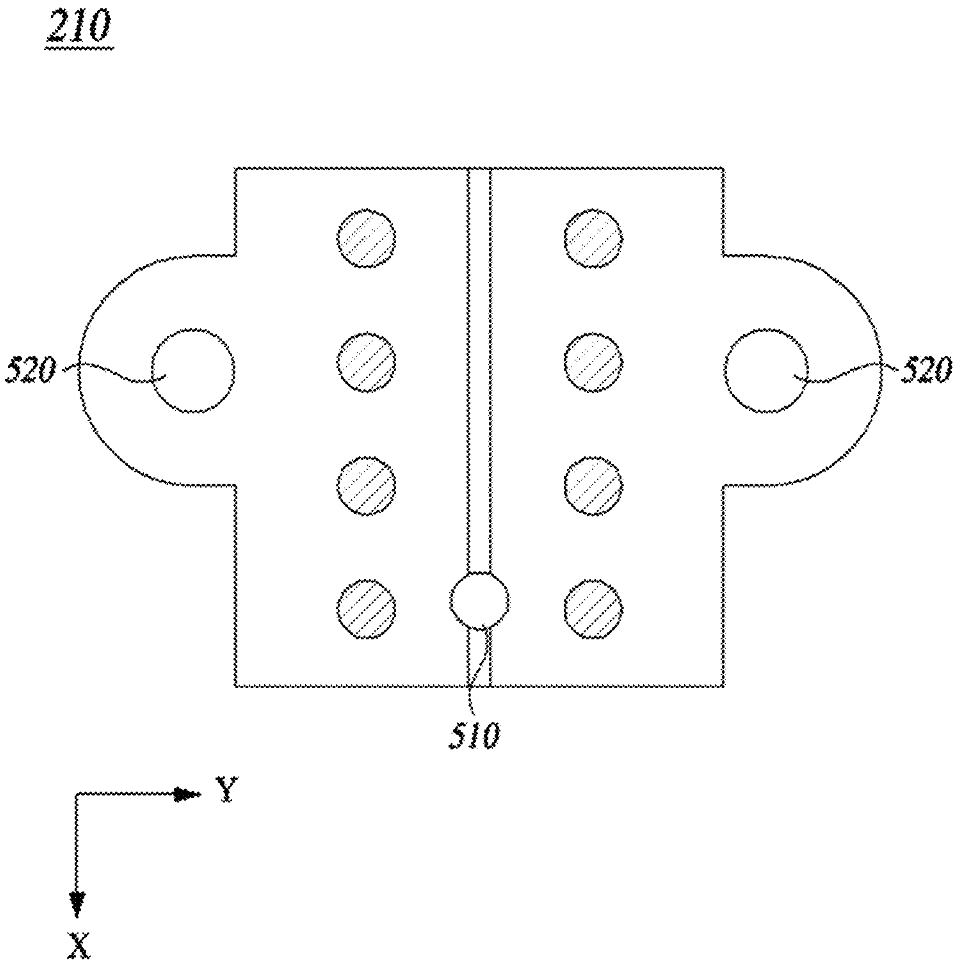
FIG. 5 is a plan view of a signal transmission portion according to an exemplary embodiment of the present disclosure.

FIG. 5 is a plan view of a signal transmission portion according to an exemplary embodiment of the present disclosure.

Referring to FIG. 1, FIG. 2, FIG. 3, FIG. 4, and FIG. 5, a monopole antenna 100 according to an exemplary embodiment of the present disclosure includes an antenna portion 110, a signal transmission portion 210, and a signal feeding portion 120, a base 130, an adhesion portion 220, and a cover 140.

The antenna portion 110 may include a pole 310 and a connecting member 320.

The pole 310 may include a body portion 311 and an extension portion 312.

The connecting member 320 may include a first connecting portion 321, a second connecting portion 322, and a third connecting portion 323.

The signal transmission portion 210 may include a penetration hole 510 and a first connecting hole 520.

The base 130 may include a second connecting hole (shown to be penetrated by a penetration protrusion 221 in FIGS. 2, 3, or the like).

The adhesion portion 220 may include the penetration protrusion 221.

The antenna portion 110 may be formed to extend long in a monopole structure. The antenna portion 110 may be disposed perpendicular to the ground surface E. The antenna portion 110 is connected to the signal transmission portion 210. The antenna portion 110 can receive a signal provided from the signal feeding portion 120 through the signal transmission portion 210. The antenna portion 110 may be disposed perpendicular to the signal transmission portion 210, the signal feeding portion 120, the base 130, the adhesion portion 220, and/or the ground surface E. The antenna portion 110 is supported by the signal transmission portion 210, the base 130, the ground surface E, and the like.

The antenna portion 110 may be formed in a shape in which a plurality of cylinders having different radii are connected. In the instant case, the antenna portion 110 may be configured for the individual cylinders having the different radii connected to each other, or may be configured for the integrally formed cylinders. Furthermore, when the antenna portion 110 includes a shape in which the plurality of cylinders with different radii are connected, the cylinder does not include a smooth external surface, and the surface may be formed in a spiral shape, or the like. For the shape of the antenna portion 110, the antenna portion 110 may include the pole 310 and the connecting member 320, the pole 310 may include the body portion 311 and the extension portion 312, the connecting member 320 may include first, second, and third connecting portions 321, 322 and 323, and at least some of these may have different radii. This makes it possible to expand an antenna bandwidth while including a stable support structure. An effect of the antenna bandwidth expansion will be described below with reference to FIG. 6.

The pole 310 is formed to extend long in a shape of a bar or the like. The pole 310 may include the body portion 311 connected to the connecting member 320, and the extension portion 312 extending long from the body portion 311. A radius of the body portion 311 may be greater than a radius of the extension portion 312. Accordingly, the stable support structure may be obtained. A receiving groove 410 into which at least a portion of the connecting member 320 (for example, the first connecting portion 321) is inserted may be formed in at least a portion of the body portion 311. The pole 310 may be coupled to the connecting member 320 by the first connecting portion 321 of the connecting member 320 being inserted into the receiving groove 410. The pole 310 and the connecting member 320 may be coupled through a screw structure. Thus, the pole 310 and the connecting member 320 are configured to be easily coupled and decoupled, and may be easily replaced with a pole 310 with a length corresponding to ¼ wavelength of the operating frequency depending on a use or the like.

The connecting member 320 connects the pole 310 to the signal transmission portion 210. The connecting member 320 may include the first connecting portion 321 connected to the pole 310, the third connecting portion 323 connected to the signal transmission portion 210, and the second connecting portion 322 disposed between the first connecting portion 321 and the third connecting portion 323. The first connecting portion 321, the second connecting portion 322, and the third connecting portion 323 may be formed integrally. The connecting member 320 may be made of a metal material. The first connecting portion 321 may be inserted into the receiving groove 410 formed in the body portion 311 of the pole 310. The third connecting portion 323 may be inserted into the penetration hole 510 formed in the signal transmission portion 210. At least two of the first connecting portion 321, the second connecting portion 322, and the third connecting portion 323 may have different radii. For example, the radius of the third connecting portion 323 may be the smallest, the radius of the second connecting portion 322 may be the largest, and the radius of the first connecting portion 321 may include a value between the radius of the third connecting portion 323 and the radius of the second connecting portion 322. However, the present disclosure is not necessarily limited thereto, and the connecting portions may be configured with various values depending on a situation such as a purpose and a use.

The signal transmission portion 210 is connected to the antenna portion 110 and the signal feeding portion 120 and transmits a signal from the signal feeding portion 120 to the antenna portion 110. The penetration hole 510 is formed in at least a portion of the signal transmission portion 210, and the third connecting portion 323 of the connecting member 320 of the antenna portion 110 is inserted into and soldered to the penetration hole 510 for electrical connection. Accordingly, signals of measurement equipment, the signal feeding portion 120, the signal transmission portion 210, and the antenna portion 110 are electrically connected. The signal transmission portion 210 may be disposed perpendicular to the antenna portion 110. The signal transmission portion 210 may be disposed parallel to the ground surface E, the signal feeding portion 120, the base 130, and the adhesion portion 220.

A transmission line is formed in at least a portion of the signal transmission portion 210. The signal transmission portion 210 may be implemented as a printed circuit board (PCB) type which is inexpensive and has an advantage of high-resolution printing. Furthermore, because the signal transmission portion 210 is implemented as the PCB type, the signal transmission portion 210 may be designed according to each signal transmission characteristic even when the signal transmission characteristics depending on a frequency are different, and the signal transmission portion 210 itself is configured not to radiate, making it possible to provide an ideal monopole antenna structure. The signal transmission portion 210 may be configured in a structure such as a Coplanar Waveguide with Ground (CPWG) or a μ-strip configured for minimizing a radiation loss, and mismatch through a 50Ω design.

The first connecting hole 520 may be formed on one side and/or the other side of the signal feeding portion 120 along the Y-axis direction in FIGS. 1, 2, 5, or the like. A second connecting hole may be formed on one side and/or the other side of the base 130. The adhesion portion 220 may include one or more penetration protrusions 221. The signal transmission portion 210, the base 130, and the adhesion portion 220 may be aligned and disposed so that the penetration protrusion 221 is provided to penetrate the first connecting hole 520 and the second connecting hole. Accordingly, the grounds of the measurement equipment, the signal transmission portion 210, the signal feeding portion 120, and the antenna portion 110 may be electrically connected to maintain the same potential.

The signal feeding portion 120 provides a signal to be fed to the antenna portion 110. The signal feeding portion 120 is connected to the signal transmission portion 210. The signal feeding portion 120 is electrically bonded to the signal transmission portion 210 by soldering. The signal feeding portion 120 may be disposed perpendicular to the antenna portion 110. The signal feeding portion 120 may be horizontally disposed to be parallel to the ground surface E. The signal feeding portion 120 may be configured for an SMA connector compatible with the measurement equipment. The signal feeding portion 120 may be appropriately designed in consideration of a thickness of the signal transmission portion 210.

The base 130 is connected to the signal transmission portion 210, the adhesion portion 220, and the ground surface E to support the antenna portion 110, the signal transmission portion 210, and the signal feeding portion 120. The base 130 may be disposed between the signal transmission portion 210 and the ground surface E in a Z-axis direction of FIGS. 1, 2, and 4. The base 130 may be made of metal. As described above, the second connecting hole may be formed on the one side and/or the other side of the base 130 based on the Y-axis direction, and the signal transmission portion 210, the base 130, and the adhesion portion 220 may be disposed so that the penetration protrusion 221 is provided to penetrate the first connecting hole 520 and the second connecting hole.

The adhesion portion 220 is connected to the signal transmission portion 210 and the base 130 to connect the monopole antenna 100 to the ground surface E. The one or more penetration protrusions 221 may be formed on the adhesion portion 220. As described above, the signal transmission portion 210, the base 130, and the adhesion portion 220 are disposed so that the penetration protrusion 221 is provided to penetrate the first connecting hole 520 and the second connecting hole, and grounds of the measurement equipment, the signal feeding portion 120, the signal transmission portion 210, and the antenna portion 110 may be electrically connected to maintain the same potential. The adhesion portion 220 may be made of a magnetic substance to thereby firmly adhere the monopole antenna 100 to the ground surface E.

The cover 140 may be configured to cover at least a portion of the antenna portion 110, at least a portion of the base 130, at least a portion of the signal feeding portion 120, the signal transmission portion 210, and/or the adhesion portion 220 so that these may be protected from the outside thereof.

Figure 6A:
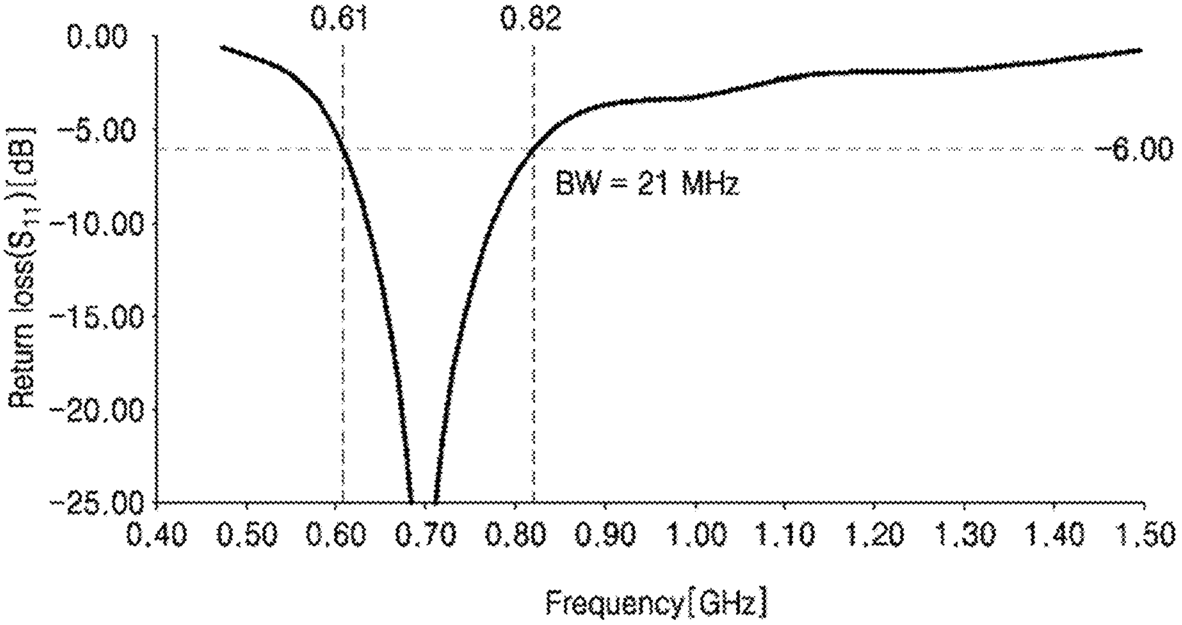
FIG. 6A and FIG. 6B are frequency-return loss graphs for a case in which an antenna portion includes a cylinder shape with a constant radius and a case in which the antenna portion includes a shape in which a plurality of cylinders with different radii are connected.
Figure 6B:
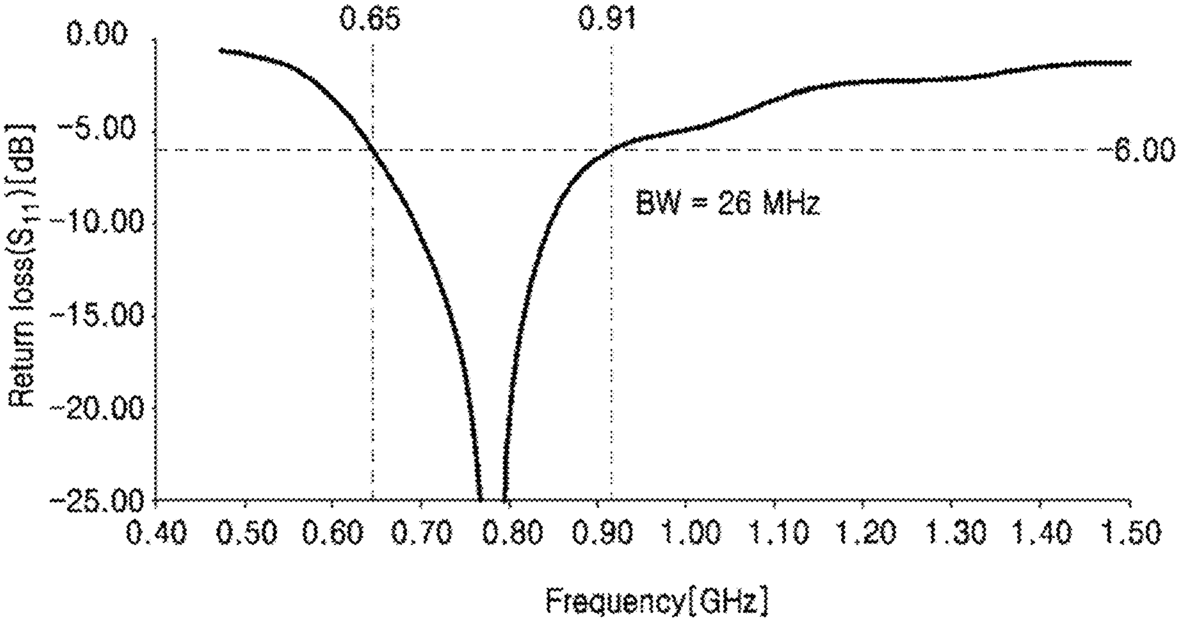

FIG. 6A and FIG. 6B are frequency-return loss graphs for a case in which the antenna portion includes a cylinder shape with a constant radius and a case in which the antenna portion includes a shape in which a plurality of cylinders with different radii are connected.

FIG. 6A is a frequency-return loss graph in the case in which the antenna portion includes a cylinder shape with a constant radius and FIG. 6B is a frequency-return loss graph in the case in which the antenna portion includes a shape in which a plurality of cylinders with different radii are connected.

It may be seen from FIG. 6A and FIG. 6B that, in the case in which the antenna portion includes a cylinder shape with a constant radius, a bandwidth (BW) is 21 MHz at a return loss of −6.00 dB, whereas in the case in which the antenna portion includes a shape in which a plurality of cylinders with different radii are connected, the bandwidth has been expanded to 26 MHz at a return loss of −6.00 dB. As a result, the monopole antenna 100 according to an exemplary embodiment of the present disclosure includes an effect that the bandwidth is expanded by forming the antenna portion 110 in the shape in which the plurality of cylinders with different radii are connected (integrally formed, or a plurality of configurations are connected).

According to an exemplary embodiment of the present disclosure, the monopole antenna includes an effect that an ideal monopole antenna structure for a determination of performance suitability in an antenna development stage is provided.

According to an exemplary embodiment of the present disclosure, the monopole antenna includes an effect that a stable structure is provided through a shape in which cylinders with different radii are connected, and a bandwidth of the antenna is expanded.

According to an exemplary embodiment of the present disclosure, the monopole antenna includes an effect that signals are efficiently transmitted by implementing a signal transmission portion as a printed circuit board (PCB) type with a transmission line formed therein.

Various implementations of the systems and techniques described herein may be realized by digital electronic circuits, integrated circuits, field programmable gate arrays (FPGAs), application specific integrated circuits (ASICs), computer hardware, firmware, software, and/or combination thereof. These various implementations may include an implementation by one or more computer programs executable on a programmable system. The programmable system includes at least one programmable processor (which may be a special purpose processor or a general-purpose processor) coupled to a storage system, at least one input device, and at least one output device to receive and transmit data and instructions therefrom and thereto. Computer programs (also known as programs, software, software applications or codes) include instructions for the programmable processor and are stored in a "computer-readable recording medium".

The computer-readable recording medium includes all types of recording devices in which data readable by a computer system is stored. The computer-readable recording medium may include non-volatile or non-transitory mediums such as ROM, RAM, CD-ROM, magnetic tape, floppy disk, memory card, hard disk, optical disk, and storage device, and may further include a temporary medium such as a data transmission medium. Furthermore, the computer-readable recording medium may be distributed in a network-connected computer system, and computer-readable codes may be stored and executed in a distributed manner.

Various implementations of systems and techniques described herein may be implemented by a programmable computer. Here, the computer includes a programmable processor, a data storage system (including a volatile memory, a nonvolatile memory, or another type of storage system or a combination thereof), and at least one communication interface. For example, a programmable computer may be one of a server, a network device, a set-top box, a built-in device, a computer expansion module, a personal computer, a laptop, a personal data assistant (PDA), a cloud computing system, and a mobile device.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A monopole antenna apparatus comprising:

an antenna portion including a monopole structure disposed perpendicular to a ground surface;

a signal feeding portion configured to provide a signal to be fed to the antenna portion;

a signal transmission portion disposed parallel to the ground surface and connected to the antenna portion and the signal feeding portion to transmit the signal to the antenna portion; and a base disposed between the ground surface and the signal transmission portion to support the signal transmission portion, wherein the antenna portion includes a shape in which a plurality of cylinders with different radii are connected.

2. The monopole antenna apparatus of claim 1, wherein the antenna portion includes:

a pole formed to extend in a predetermined length; and a connecting member connecting the pole to the signal transmission portion.

3. The monopole antenna apparatus of claim 2, wherein the pole includes:

a body portion connected to the connecting member; and an extension portion formed to extend from the body portion.

4. The monopole antenna apparatus of claim 3, wherein a radius of the body portion is greater than a radius of the extension portion.

5. The monopole antenna apparatus of claim 3, wherein a receiving groove into which at least a portion of the connecting member is inserted is formed in the body portion.

6. The monopole antenna apparatus of claim 2, wherein the connecting member includes:

a first connecting portion connected to the pole;

a third connecting portion connected to the signal transmission portion; and a second connecting portion connected between the first connecting portion and the third connecting portion.

7. The monopole antenna apparatus of claim 6, wherein the first connecting portion is inserted into a receiving groove formed in at least a portion of the pole.

8. The monopole antenna apparatus of claim 6, wherein the third connecting portion is inserted into a penetration hole formed in at least a portion of the signal transmission portion.

9. The monopole antenna apparatus of claim 6, wherein at least two of the first, second, and third connecting portions have different radii.

10. The monopole antenna apparatus of claim 9, wherein the radius of the second connecting portion is greater than the radii of the first and third connecting portions.

11. The monopole antenna apparatus of claim 10, wherein the radius of the third connecting portion is smallest and the radius of the second connecting portion is largest among the radii of the first, second and third connecting portions.

12. The monopole antenna apparatus of claim 2, wherein the pole and the connecting member are coupled through a screw structure.

13. The monopole antenna apparatus of claim 1, wherein the signal transmission portion is configured for a printed circuit board (PCB) type in which a transmission line is formed in at least portion of the signal transmission portion.

14. The monopole antenna apparatus of claim 1, further including:

an adhesion portion connected to the signal transmission portion and the base to attach the monopole antenna apparatus to the ground surface.

15. The monopole antenna apparatus of claim 14, wherein the signal transmission portion includes one or more first connecting holes formed in at least one of a first side and a second side of the signal transmission portion, wherein the base includes one or more second connecting holes formed in at least one of a first side and a second side of the base, wherein the adhesion portion includes one or more penetration protrusions, and wherein the signal transmission portion, the base, and the adhesion portion are disposed so that the one or more penetration protrusions is provided to penetrate the one or more first connecting holes and the one or more second connecting holes.

16. The monopole antenna apparatus of claim 14, wherein the adhesion portion is made of a magnetic substance.

17. The monopole antenna apparatus of claim 14, further including a cover to cover at least a portion of the antenna portion, at least a portion of the base, at least a portion of the signal feeding portion, the signal transmission portion, and the adhesion portion.

18. The monopole antenna apparatus of claim 1, wherein the signal feeding portion is disposed perpendicular to the antenna portion and horizontally disposed to be parallel to the ground surface.

* * * * *